(12) United States Patent
Kosuda

(10) Patent No.: US 7,174,322 B2
(45) Date of Patent: Feb. 6, 2007

(54) METHOD OF, APPARATUS AND SYSTEM FOR AUTOMATIC TRANSACTION

(75) Inventor: Hiroyuki Kosuda, Maebashi (JP)

(73) Assignee: Fujitsu Limited, Kawsaki (JP)

( * ) Notice: Subject to any disclaimer, the term of this patent is extended or adjusted under 35 U.S.C. 154(b) by 0 days.

(21) Appl. No.: 10/226,317

(22) Filed: Aug. 23, 2002

(65) Prior Publication Data

US 2003/0023565 A1   Jan. 30, 2003

Related U.S. Application Data

(63) Continuation of application No. PCT/JP00/01812, filed on Mar. 24, 2000.

(51) Int. Cl.
G06Q 99/00 (2006.01)

(52) U.S. Cl. .......... 705/72; 705/64; 709/203; 709/225; 709/226; 709/227

(58) Field of Classification Search .......... 705/64, 705/72
See application file for complete search history.

(56) References Cited

U.S. PATENT DOCUMENTS

| | | | | |
|---|---|---|---|---|
| 5,832,464 | A * | 11/1998 | Houvener et al. | 705/45 |
| 6,023,688 | A * | 2/2000 | Ramachandran et al. | 705/44 |
| 6,325,505 | B1 * | 12/2001 | Walker | 347/105 |
| 2001/0023415 | A1 * | 9/2001 | Keil | 705/44 |
| 2001/0039533 | A1 * | 11/2001 | Pare et al. | 705/39 |
| 2002/0012018 | A1 * | 1/2002 | Ohtsuka et al. | 347/19 |
| 2002/0013771 | A1 * | 1/2002 | Blackson et al. | 705/43 |
| 2002/0026421 | A1 * | 2/2002 | Drummond et al. | 705/43 |
| 2002/0138351 | A1 * | 9/2002 | Houvener et al. | 705/18 |
| 2003/0121599 | A1 * | 7/2003 | Yamamoto | 156/247 |

FOREIGN PATENT DOCUMENTS

| | | |
|---|---|---|
| JP | 6-119528 | 4/1994 |
| JP | 6-215234 | 8/1994 |
| JP | 10-149400 | 6/1998 |
| JP | 10-207970 | 8/1998 |
| JP | 11-39381 | 2/1999 |
| JP | 11-45366 | 2/1999 |

* cited by examiner

*Primary Examiner*—Firmin Backer
(74) *Attorney, Agent, or Firm*—Armstrong, Kratz, Quintos, Hanson & Brooks, LLP

(57) ABSTRACT

A customer information database storing at least a unique customer identification number (basic pension number) allocated to the customers by an official body and information of an account number, an amount outstanding, password, and the like which correspond to the customer identification number are stored. An input screen control section controls screen display for inputting the customer identification number and the password. A control section performs authentication check based on customer information in the customer information database and the input customer identification number and the password as a key. A main control section performs various transactions at a financial institution on the basis of the result of the authentication.

8 Claims, 12 Drawing Sheets

FIG.9
(a)
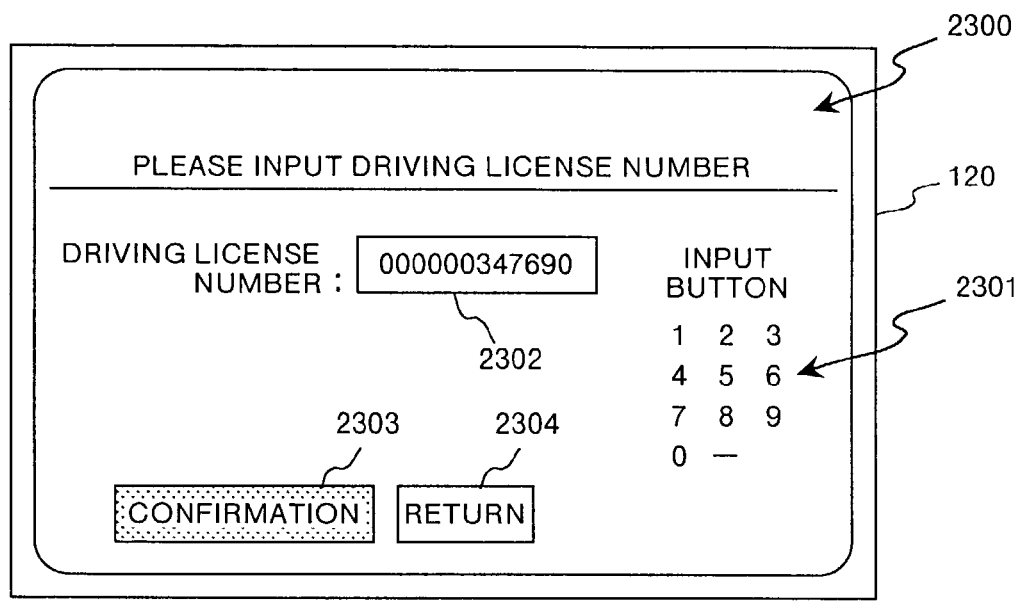
(b)
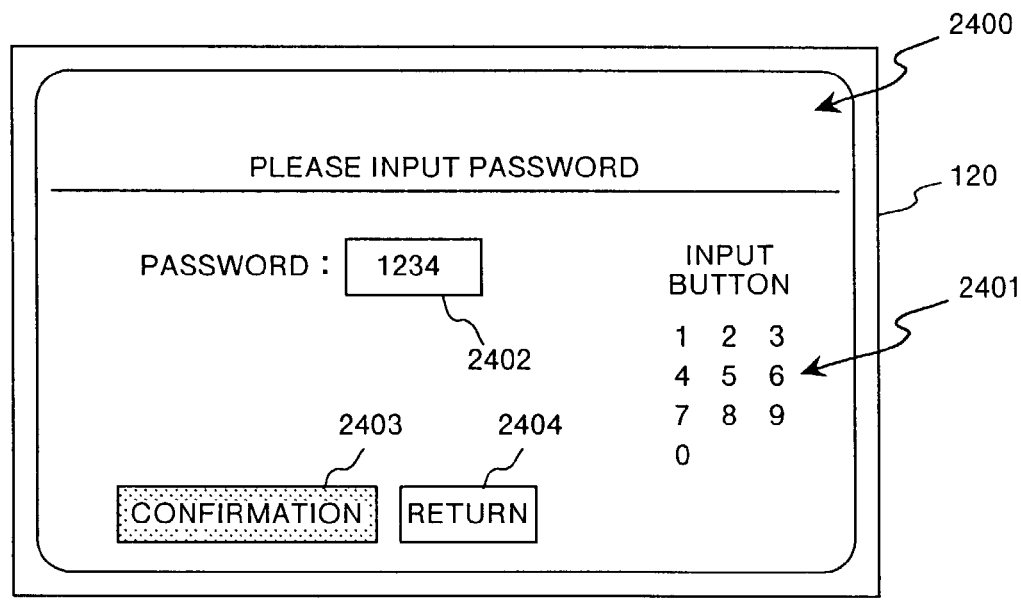

FIG.11
(a) 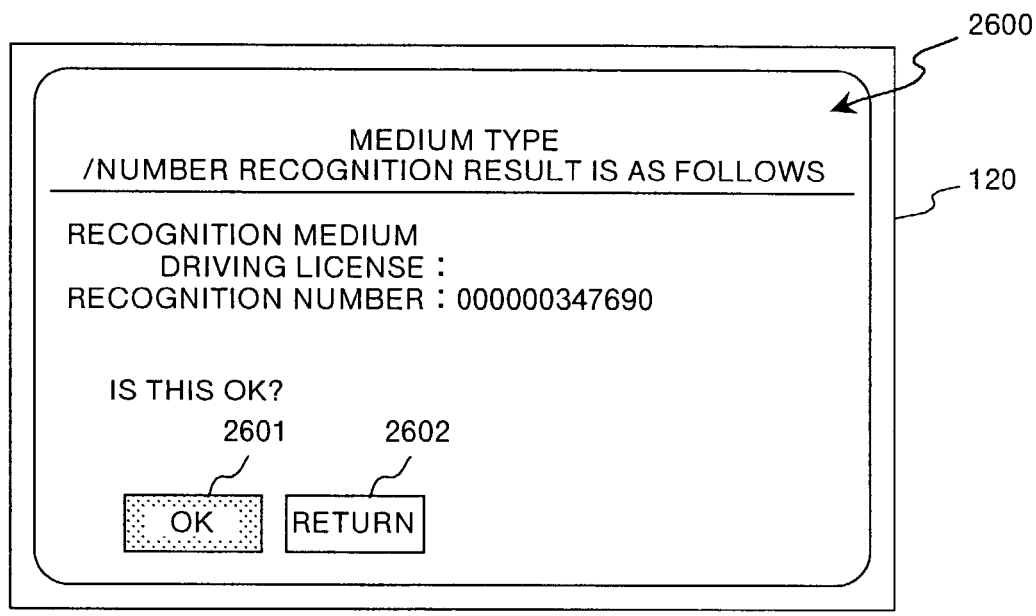
(b) 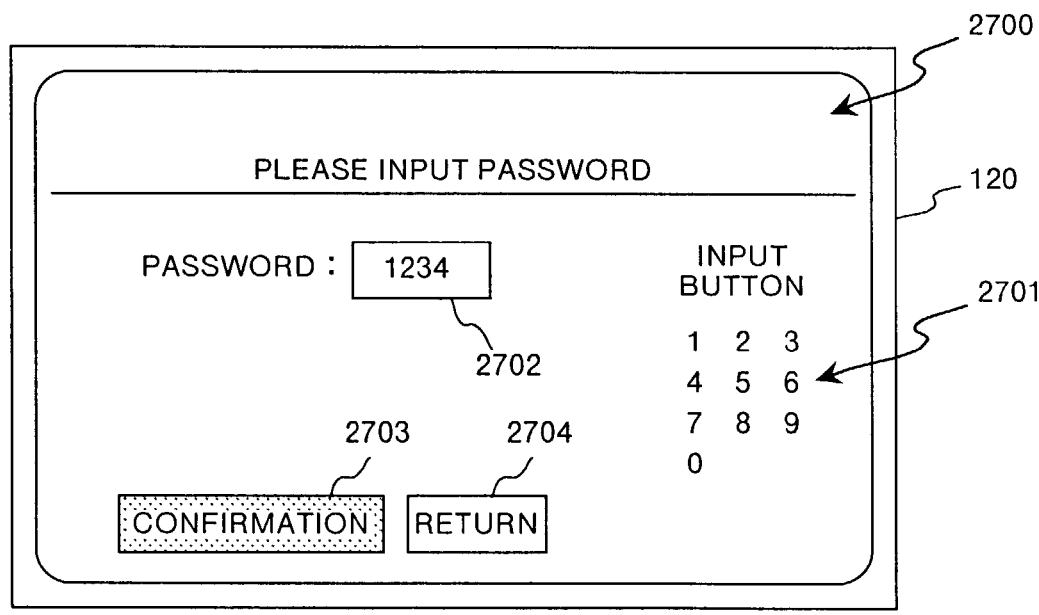

METHOD OF, APPARATUS AND SYSTEM FOR AUTOMATIC TRANSACTION

This application is a continuation of international application PCT/JP00/01812 filed on Mar. 24, 2000.

BACKGROUND OF THE INVENTION

1. Field of the Invention

The present invention relates to a method of, an apparatus and a system for an automatic transaction that make it possible to perform a transaction in an account opened by a customer without using a cash-card or a passbook. Nowadays integration of financial institutions has become common. The financial institutions are making more efforts than ever before for improving services to the customer. Moreover, the financial institutions are trying to make the services more convenient from the viewpoint of the customer. In this situation, means and methods that make the services convenient are in demand.

2. Description of the Related Art

Conventionally, at a financial institution such as a bank, a customer receives a cash-card and a passbook when she/he opens an account. The customer inserts the cash-card or the passbook into an automatic transaction machine installed in a financial institution to perform transactions such as deposits, withdrawals and transfers.

Conventionally, a customer feels inconvenienced in having to carry a cash-card or a passbook. When the customer leaves the cash-card and the passbook in her/his house, even the customer herself/himself cannot perform a transaction at a financial institution.

The present invention has been achieved in consideration of the above circumstances. It is an object of the present invention to provide a method of, an apparatus and a system for automatic transaction which can reduce inconveniences to customers while maintaining the security of transactions.

SUMMARY OF THE INVENTION

The present invention provides an automatic transaction machine which executes a money transaction on the basis of an operation of a customer and which is connected to a communication network to which a host apparatus having a financial institution database in which customer information including an account number of a customer and a password corresponding to the account number is stored and an authentication organization database in which authentication information including a unique identification number allocated to the customer by another authentication organization is stored are connected, comprising, an input unit which inputs the unique identification number and the password corresponding to the account number, a communication unit which transmits the identification number and the password input by the input unit to the host apparatus, which causes the host apparatus to specify customer information on the basis of authentication information acquired from the authentication organization database by using the input identification number as a key and to collate the password of a specified account with the input password, and a transaction unit which performs various transactions at a financial institution on the basis of a collation result of the password.

According to the present invention, when the identification number and the password are input by the input unit, the communication unit transmits the identification number and the password to the host apparatus through the communication network. In this manner, the host apparatus specifies customer information on the basis of the authentication information acquired from the authentication organization database by using the identification number as a key and collates the password of the specified account with the input password. The transaction unit performs various transactions at a financial institution on the basis of the collation result of the password.

In this manner, according to the present invention, because collation and transaction are performed on the basis of the identification number, a customer need not carry a cash-card and a passbook, unlike a conventional art. For this reason, the convenience of the customer can be improved while keeping security related to the transaction.

The present invention provides an automatic transaction machine wherein the input unit includes a touch panel display section which is used by the customer to manually input the identification number.

According to the present invention, when an identification number is input by the touch panel display section, collation based on the identification number and the password is performed by the collation unit. When the collation is normally ended, various transactions are performed by the transaction unit.

In this manner, according to the present invention, because collation and transaction are performed on the basis of the identification number input from the touch panel display section, a customer need not carry a cash-card and a passbook, unlike a conventional art. For this reason, the convenience of the customer can be improved while maintaining security related to the transaction.

The present invention provides an automatic transaction machine wherein the input unit includes a reading section which optically reads the identification number from a medium which is issued by the other authentication organization and on which the identification number is printed.

According to the present invention, when the identification number printed on the medium is read by the reading section, the collation unit performs collation based on the identification number and the password. When the collation is normally ended, various transactions are performed by the transaction unit.

In this manner, according to the present invention, because the identification number is automatically input by using the medium, the customer need not memorize her/his identification number. For this reason, the convenience of the customer can be improved.

The present invention provides an automatic transaction machine wherein the input unit includes a reading section which reads information of the identification number from a recording medium on which only information of the identification number is recorded.

According to the present invention, when the identification number is read from the recording medium by the reading section, collation based on the identification number and the password is performed by the collation unit. When the collation is normally ended, various transactions are performed by the transaction unit.

In this manner, according to the present invention, because the identification number is automatically input by using the recording medium on which only the identification number is recorded, the customer need not memorize her/his identification number. For this reason, the convenience of the customer can be improved.

The present invention provides an automatic transaction machine wherein the identification number is at least one of a basic pension number, a basic resident register number, a driving license number, a health insurance card number, and a passport number.

According to the present invention, when a basic pension number, a basic resident register number, a driving license number, a health insurance card number, or a passport number is input from the input unit as an identification number, collation based on the identification number and the password is performed by the collation unit. When the collation is normally ended, various transactions are performed by the transaction unit.

In this manner, according to the present invention, because collation and transaction are performed on the basis of a basic pension number, a basic resident register number, a driving license number, a health insurance card number, or a passport number which is the identification number, the convenience of the customer can be improved while maintaining security related to the transaction.

The present invention provides an automatic transaction machine which executes a money transaction on the basis of an operation of a customer and which is connected to a host apparatus having a database in which customer information including a unique identification number allocated to the customer by an authentication organization different from a financial institution, an account number of the customer corresponding to the identification number, and a password corresponding to the account number is stored, including an input unit which inputs the unique identification number and the password corresponding to the account number, a communication unit which transmits the identification number and the password input by the input unit to the host apparatus, which causes the host apparatus to collate the account number of the customer and the password corresponding to the account number with the input password by using the input identification number as a key, and a transaction unit which performs various transactions at the financial institution on the basis of a collation result of the password.

According to the present invention, when the identification number and the password are input by the input unit, the communication unit transmits the identification number and the password to the host apparatus through a communication network. In this manner, the host apparatus specifies customer information on the basis of the authentication information acquired from the authentication organization database by using the identification number as a key and collates the password of the specified account with the input password. The transaction unit performs various transactions at the financial institution on the basis of the collation result of the password.

In this manner, according to the present invention, because collation and transaction are performed on the basis of the identification number, a customer need not carry a cash-card and a passbook, unlike a conventional art. For this reason, the convenience of the customer can be improved while keeping security related to the transaction.

The present invention provides an automatic transaction system having an automatic transaction machine operated by a customer and a host apparatus connected to the automatic transaction machine, wherein the host apparatus has a financial institution database in which customer information including an account number of a customer and a password corresponding to the account number are stored, and is connected to an authentication organization database in which authentication information including a unique identification number allocated to the customer by another authentication organization is stored, through a communication network, the automatic transaction machine has an input unit which inputs the unique identification number and the password corresponding to the account number, the host apparatus has a collation unit which specifies customer information on the basis of the authentication information acquired from the authentication organization database by using the identification number input by the input unit as a key and which collates a password in the specified customer information with the password input by the input unit, and the automatic transaction machine performs various transactions at a financial institution on the basis of the collation result.

According to the present invention, when the identification number and the password are input by the input unit, a communication unit transmits the identification number and the password to the host apparatus through the communication network. In this manner, the host apparatus specifies customer information on the basis of the authentication information acquired from the authentication organization database by using the identification number as a key and collates the password of the specified account with the input password. The automatic transaction machine performs various transactions at the financial institution on the basis of the collation result of the password.

In this manner, according to the present invention, because collation and transaction are performed on the basis of the identification number, a customer need not carry a cash-card and a passbook unlike, a conventional art. For this reason, the convenience of the customer can be improved while maintaining security related to the transaction.

The present invention provides an automatic transaction system including a register unit which registers the identification number in response to the account number.

According to the present invention, the identification number is registered by the register unit. When the identification number is input by the input unit, the collation unit performs collation on the basis of the identification number and the password. When the collation is normally ended, various transactions are performed by the automatic transaction machine.

In this manner, according to the present invention, because collation and transaction are performed on the basis of the identification number, a customer need not carry a cash-card and a passbook, unlike a conventional art. For this reason, the convenience of the customer can be improved while maintaining security related to the transaction.

The present invention provides an automatic transaction method for executing money transaction by using an automatic transaction machine, comprising, a first step of connecting the automatic transaction machine, a host apparatus having a financial institution database in which customer information including an account number of a customer and a password corresponding to the account number is stored, and an authentication organization database in which authentication information including a unique identification number allocated to the customer by another authentication organization is stored through a network, a second step of acquiring authentication information from the authentication organization database by using the unique identification number input to the automatic transaction machine as a key, a third step of specifying customer information in the financial institution database on the basis of the acquired authentication information, a fourth step of collating a password corresponding to an account number in the specified customer information with a password input to the automatic transaction machine, and a fifth step of performing various transactions at a financial institution on the basis of the collation result.

According to the present invention, when the automatic transaction machine, the host apparatus, and the authentication organization database are connected to each other through the communication network in the first step, authentication information is acquired from the authentication organization database by using the identification number input to the automatic transaction machine as a key in the second step. In this manner, the customer information in the financial institution database is specified on the basis of the authentication information in the third step, and the password corresponding to the specified account number with the input password are collated in the fourth step. Various transactions at a financial institution are performed on the basis of the collation result of the password in the fifth step.

In this manner, because collation and transaction are performed on the basis of the identification number, a customer need not carry a cash-card and a passbook, unlike a conventional art. For this reason, the convenience of the customer can be improved while keeping security related to the transaction.

DESCRIPTION OF THE PREFERRED EMBODIMENT

An embodiment of the present invention will be described below with reference to the accompanying drawings to more specifically explain the present invention.

Figure 1:
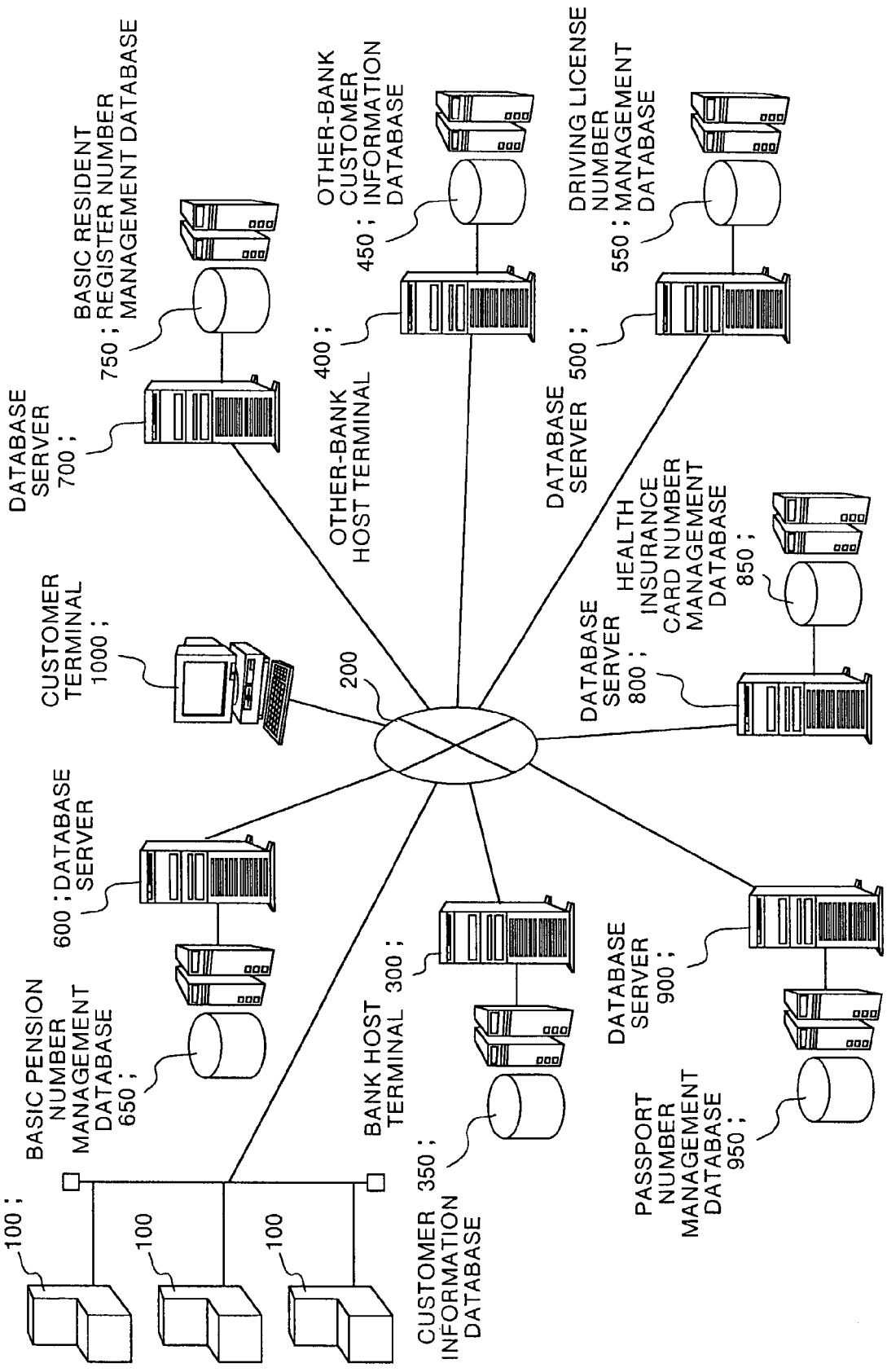
FIG. 1 is a block diagram which shows the configuration of an embodiment of the present invention.

FIG. 1 is a diagram which shows a system configuration of an automatic transaction machine according to an embodiment of the present invention. In this figure, automatic transaction machines 100, 100, . . . are installed in a financial institution (e.g., a bank), and are apparatuses which automatically perform transactions such as deposit and withdrawal, transfer, or balance inquiry by using a cash-card or a passbook held by a customer and a basic pension number, a basic resident register number, a driving license number, and the like described later.

These automatic transaction machines 100, 100, . . . are connected to a network 200 and have transmission functions for transmitting/receiving various data with a bank host terminal 300. The network 200 interconnects the automatic transaction machines 100, 100, . . . the bank host terminal 300, and a customer terminal 1000, and is a WAN (Wide Area Network), for example.

Figure 2:
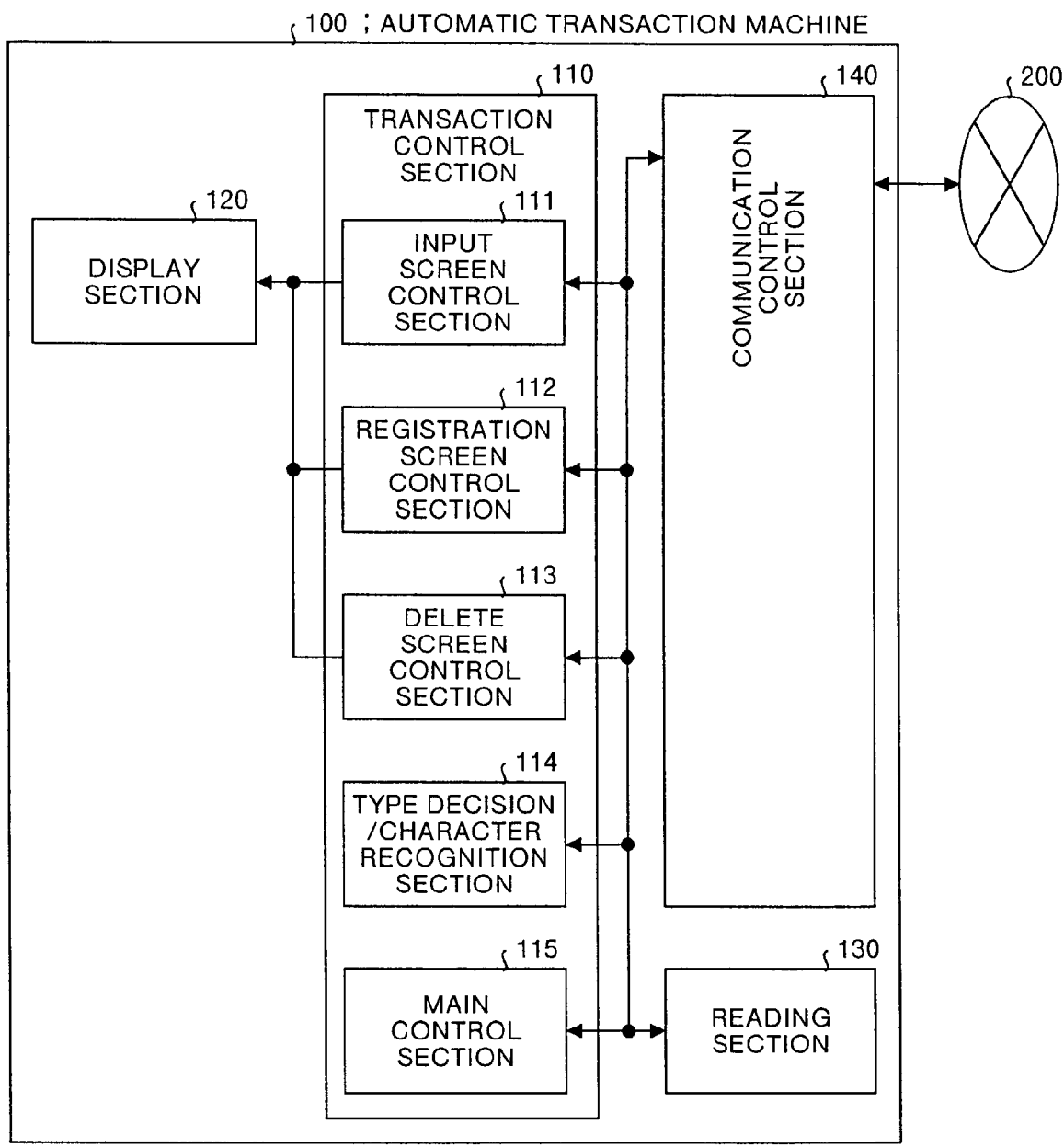
FIG. 2 is a block diagram which shows the configuration of an automatic transaction machine 100 shown in FIG. 1.

FIG. 2 is a block diagram which shows the configuration of the automatic transaction machine 100 shown in FIG. 1. In this figure, the same reference numerals as in FIG. 1 denote the same parts. However, in FIG. 2, one automatic transaction machine 100 of the plurality of automatic transaction machines 100, 100, . . . is shown. This automatic transaction machine 100 is constituted by a transaction control section 110, a display section 120, a reading section 130, and a communication control section 140.

Figure 4:
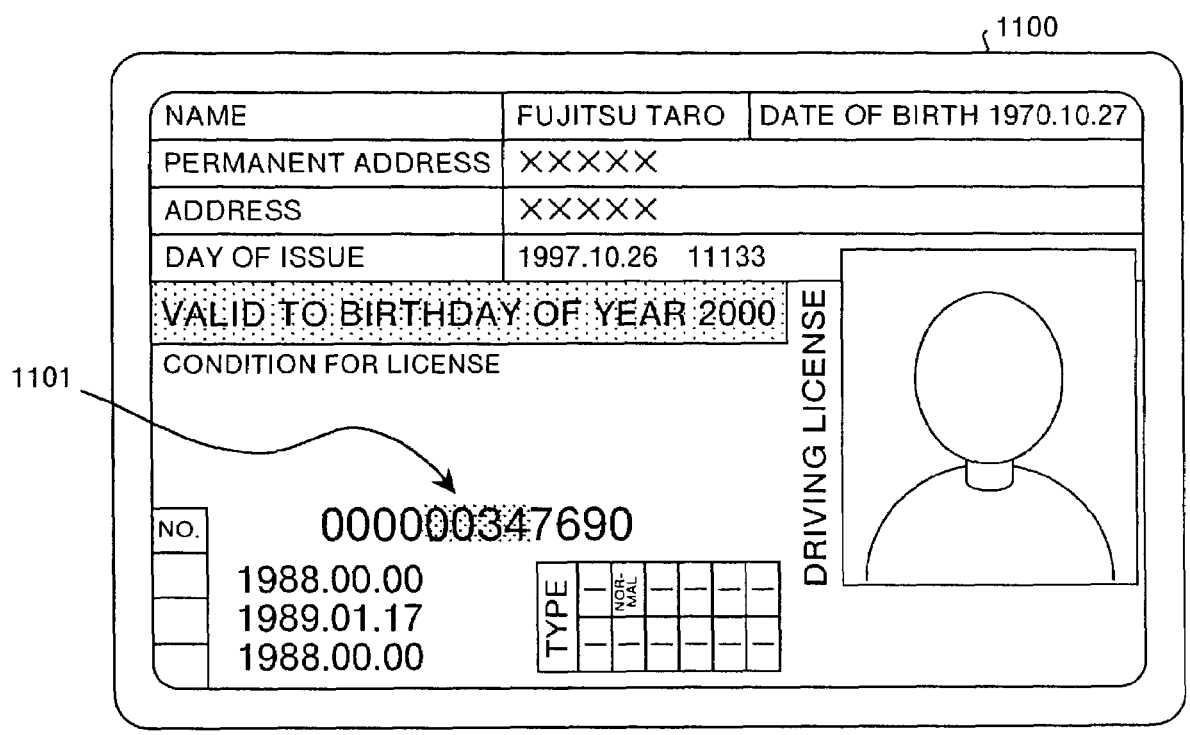
FIG. 4 is a plan view which shows a driving license 1100 used in the embodiment.

In the automatic transaction machine 100, in addition to a cash-card and a passbook (not shown) for normal transaction, a driving license 1100 (see FIG. 4), a number card 1200 (see FIG. 5), and the like are used. The driving license 1100 and the number card 1200 will be described below in detail.

A transaction control section 101 performs control related to transactions such as deposit and withdrawal, transfer, and balance inquiry, and is constituted by an input screen control section 111, a registration screen control section 112, a delete screen control section 113, a type decision/character recognition section 114, and a main control section 115. These input screen control section 111, the registration screen control section 112, and the delete screen control section 113 control a display screen displayed on the display section 120.

Figure 8:
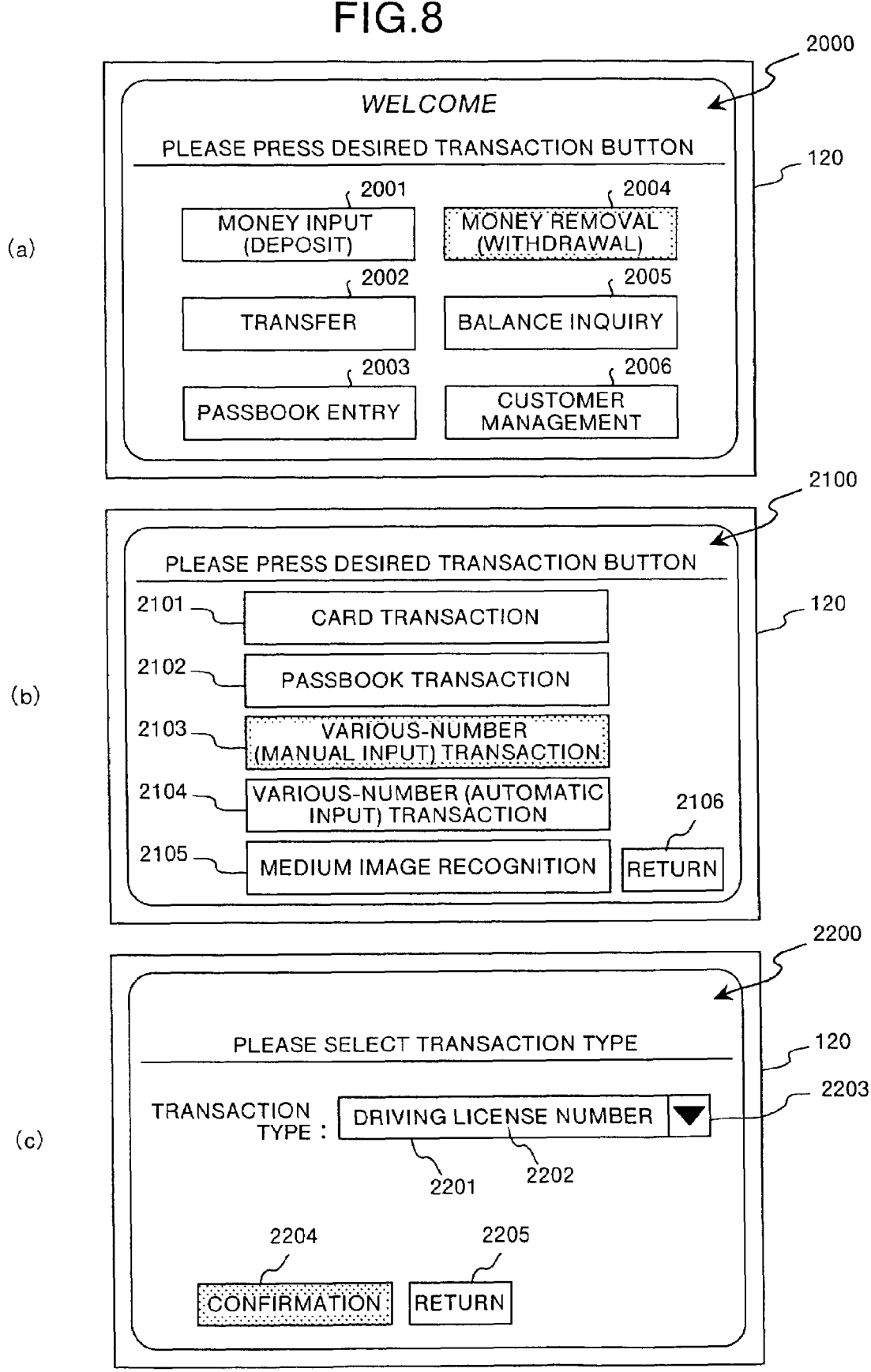
FIGS. 8(a) to 8(c) are diagrams which show various display screens of a display section 120 shown in FIG. 2, FIGS. 9(a) and 9(b) are diagrams which show various display screens of the display section 120.

The display section 120 is a CRT (Cathode-Ray Tube) or an LCD (Liquid Crystal Display), and displays various screens such as a transaction screen 2000 (see FIG. 8(a)) and a various-number input screen 2300 (see FIG. 9(a)), depending on transaction forms. A customer performs a desired transaction according to various screens. On the surface of the display section 120, a touch panel (not shown) which is pressed by a finger of the customer to function as an electronic button (switch) is applied.

The input screen control section 111 controls a screen display of the transaction screen 2000 (see FIG. 8(a)). The registration screen control section 112 controls screen display which is to register a customer identification number. The customer identification number mentioned here is a unique identification number allocated to a nation (foreigner, depending on the circumstances) by an official body. For example, as the customer number, a driving license number, a basic pension number, a basic resident register number (also called a resident card code), a health insurance card number, a passport number, or the like is cited. The delete screen control section 113 controls screen display for deleting a registered customer identification number.

The type decision/character recognition section 114 has a function of deciding the type of a medium on which a customer identification number is printed and a function of optically recognizing the customer identification number printed on the medium as characters. As the medium, when customer identification number=driving license number, it is a driving license 1100 (see FIG. 4). When customer identification number=basic pension number, it is a pension notebook. When customer identification number=basic resident register number, the medium is a resident card. When customer identification number=health insurance card number, the medium is a health insurance card. When customer identification number=passport number, the medium is a passport.

The main control section 115 performs drive control of the reading section 130, control of the input screen control section 111 to the type decision/character recognition section 114, and control or the like related to various transactions (money deposit, withdrawal, and the like). The reading section 130 has a function of magnetically reading customer information from a cash-card (not shown), a passbook, a number card 1200 (see FIG. 5) and a function of optically reading a customer identification number from a medium (e.g., the driving license 1100 (see FIG. 4)).

Figure 5:
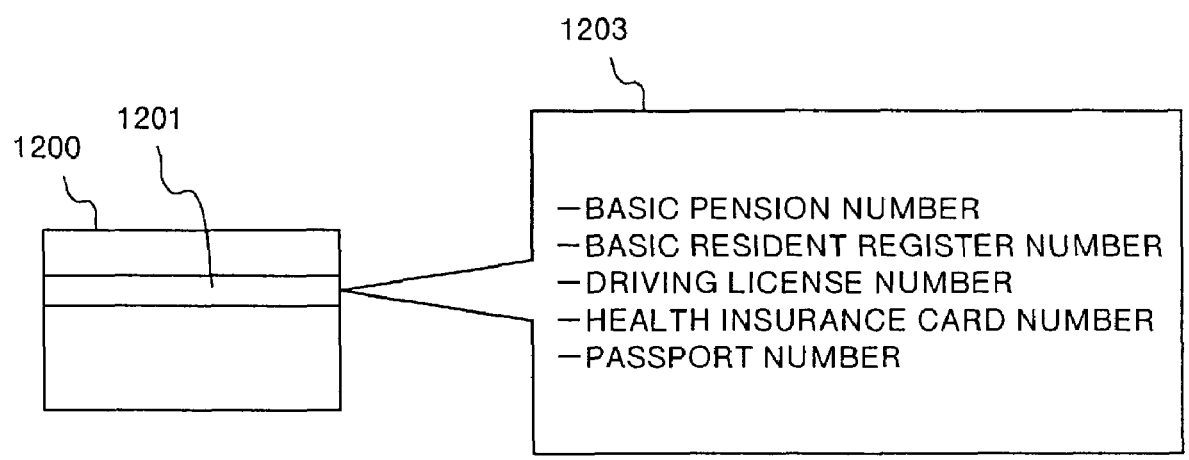
FIG. 5 is a diagram which shows the configuration of a number card 1200 used in the embodiment.

The number card 1200 shown in FIG. 5 has a magnetic stripe 1201. Customer identification number information 1203 is recorded on the magnetic stripe 1201. As the customer identification number information 1203, the basic pension number, the basic resident register number, the driving license number, the health insurance card number, the passport number, and the like are cited. The number card 1200 is used to omit a time-consuming labor that the customer manually inputs a customer identification number. Returning to FIG. 2, the communication control section 140 controls communication performed with the external device through the network 200 according to a predetermined communication protocol.

Returning to FIG. 1, the bank host terminal 300 is a computer terminal which performs communication with the automatic transaction machines 100, 100, 100, . . . , an other-bank host terminal 400, a database server 500, . . . , the customer terminal 1000 (to be referred to as an external device hereinafter), concentrically managing customer information related to an account number, an account type, name, and an amount outstanding, and the like at a financial institution in which the automatic transaction machine 100 is installed. In the embodiment, the automatic transaction machine 100 may have the functions of the bank host terminal 300.

Figure 3:
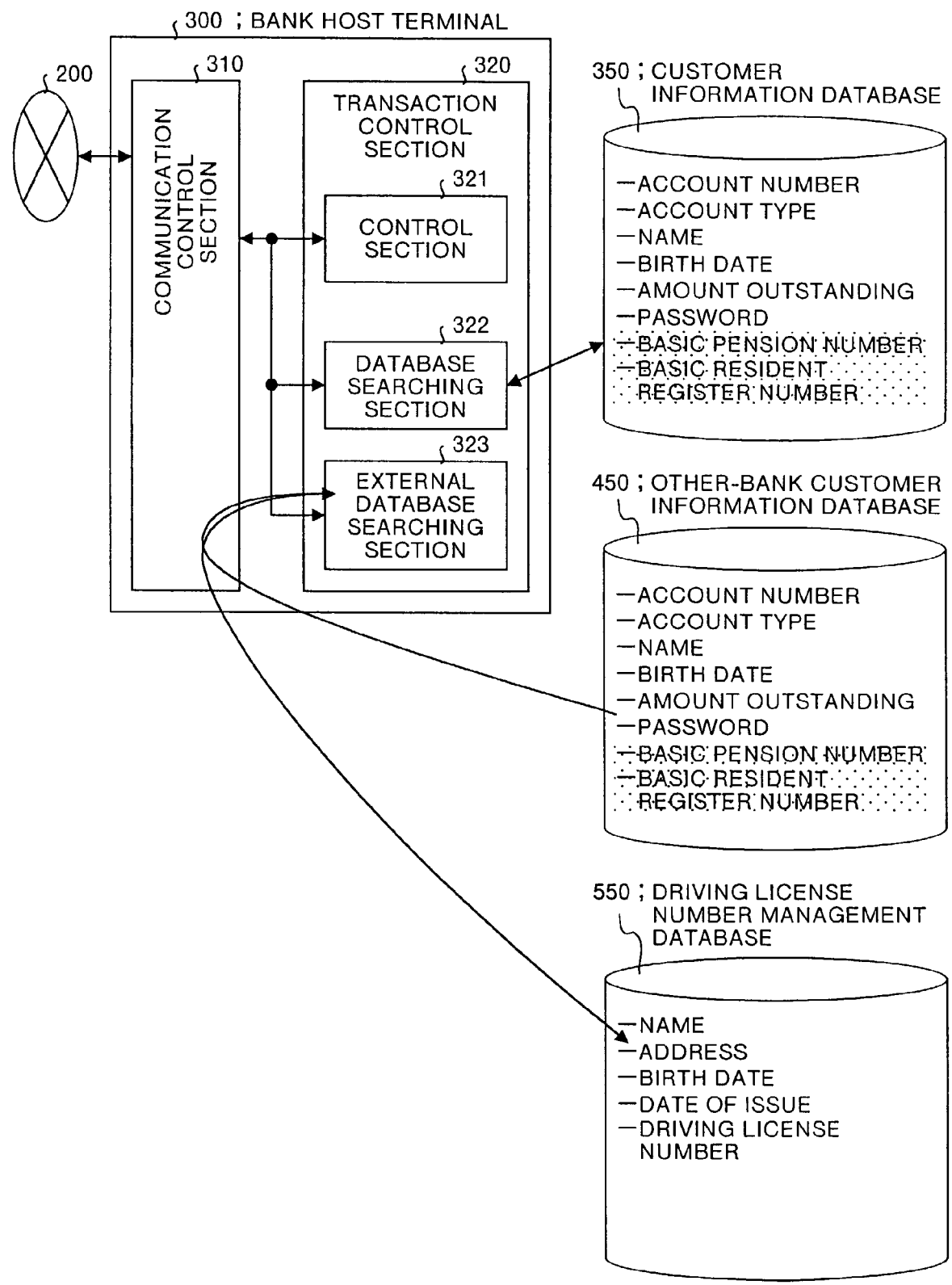
FIG. 3 is a block diagram which shows the configuration of a bank host terminal 300 shown in FIG. 1.

FIG. 3 is a block diagram which shows the configuration of the bank host terminal 300 shown in FIG. 1. The bank host terminal 300 shown in this figure has a communication control section 310 and a transaction control section 320. The communication control section 310 performs communication with an external apparatus through the network 200 according to a predetermined communication protocol. The transaction control section 320 is constituted by a control section 321, a database searching section 322, and an external database searching section 323, and controls transactions with reference to a customer information database 350, an other-bank customer information database 450, a driving license number management database 550, and the like.

The control section 321 controls a transaction on the basis of information obtained from the customer information database 350 or the like. The customer information database 350 is constituted by general information relating to a customer having opened an account (account number, account type, name, birth date, amount outstanding, and password) and a customer identification number (e.g., basic pension number or basic resident register number).

The other-bank host terminal 400 shown in FIG. 1 is installed in a computer center of another financial institution and concentrically manages customer information related to the account number, the account type, the name, the amount outstanding, and the like with reference to the other-bank customer information database 450. The other-bank customer information database 450, as shown in FIG. 3, is constituted by general information relating to a customer having opened an account (account number, account type, name, birth date, amount outstanding, and password) and a customer identification number (e.g., Basic pension number or basic resident register number).

The database server 500 shown in FIG. 1 is a server which manages the driving license number management database 550, and is installed in an official body. The driving license number management database 550, as shown in FIG. 3, is constituted by a name, an address, a birth date, date of issue, a driving license number, and the like related to a person to which the driving license is issued. A database server 600 is a server which manages a basic pension number management database 650, and is installed in an official body. The basic pension number management database 650 is constituted by a name, an address, a birth date, a basic pension number, and the like related to a person to which the basic pension number is given.

A database server 700 is a server which manages a basic resident register number management database 750, and is installed in an official body. The basic resident register number management database 750 is constituted by a name, an address, a birth data, a basic resident register number, and the like related to a resident. A database server 800 is a server which manages a health insurance card number management database 850, and is installed in an official body. The health insurance card number management database 850 is constituted by a name, an address, a birth data, a health insurance card number, and the like related to a subscriber of National Health Insurance or the like.

A database server 900 is a server which manages a passport number management database 950, and is installed in an official body. The passport number management database 950 is constituted by a nationality, a name, an address, a birth date, a passport number, and the like related to a person to which a passport is issued. The customer terminal 1000 is a terminal which is to receive net banking service, and accesses the bank host terminal 300 through the network 200 to perform an on-line transaction.

The operation of the embodiment will be described below with reference to the flow charts shown in FIG. 6 and FIG. 7. In step SA1 shown in FIG. 6, the input screen control section 111 (see FIG. 2) displays a transaction screen 2000 shown in FIG. 8(a) on the display section 120 under the control of the main control section 115.

The transaction screen 2000 is a screen which causes a customer to select a desired one of a plurality of transactions such as money deposit, transfer, passbook entry, withdrawal and balance inquiry, and customer management. On the transaction screen 2000, as transaction buttons, a money input button (deposit) 2001, a transfer button 2002 which is to select transfer, a passbook entry button 2003 which is to select passbook entry, a money removal button (withdrawal) 2004 which is to select withdrawal, and a balance inquiry button 2005 which is to select balance inquiry are displayed. On the transaction screen 2000, a customer management button 2006 is also displayed.

In step SA2, the input screen control section 111 decides whether or not a transaction button (money input button 2001 to balance inquiry button 2005) or the customer management button 2006 is pressed by a customer on the transaction screen 2000. When the decision result is "No", this decision is repeated. When the money input button 2001 is pressed as the transaction button by the customer, the input screen control section 111 sets the decision result in step SA2 as "Yes". In step SA3, the input screen control section 111 displays a transaction form selection screen 2100 on the display section 120.

The transaction form selection screen 2100 is a screen which is to cause a customer to select a desired transaction form from a plurality of transaction forms. As the plurality of transaction forms, a transaction (to be referred to as a card transaction) using a cash-card, a transaction (to be referred to as a passbook transaction) using a passbook, a transaction (to be referred to as a customer identification number manual input transaction) using a customer identification number manually input by a customer, a transaction (to be referred to as a customer identification number automatic input transaction) using a customer identification number automatically input by using the number card 1200 (see FIG. 5), and a transaction (to be referred to as a customer identification number medium input transaction) using an image recognition result (customer identification number) of a medium (e.g., the driving license 1100, see FIG. 4) are cited.

On the transaction form selection screen 2100, a card transaction button 2101 which is to select a card transaction, a passbook transaction button 2102 which is to select a passbook transaction, a customer identification number manual input button 2103 which is to select a customer identification number manual input transaction, a customer identification number automatic input button 2104 which is to select a customer identification number automatic input transaction, an identification number medium input button 2105 which is used to select a customer identification number medium input transaction, and a previous screen transition button 2106 which is to return to the previous screen (transaction screen 2000) are displayed.

In step SA4, the input screen control section 111 decides whether or not one button of the card transaction button 2101 to the identification number medium input button 2105 is pressed. When the decision result is "No", the same decision is repeated. In this instance, when a customer presses the card transaction button 2101 or the passbook transaction button 2102, the decision result in step SA4 becomes "Yes". In step SA5, the main control section 115 executes a process related to an existing transaction and then ends a series of processes.

When the customer identification number manual input button 2103 is pressed by the customer, the input screen control section 111 sets the decision result in step SA4 as "Yes". In step SA6, the input screen control section 111 displays a transaction type selection screen 2200 shown in FIG. 8(c), on the display section 120.

The transaction type selection screen 2200 is a screen which permits a customer to select the type (to be referred to as a transaction type) of a customer identification number (driving license number, basic pension number, basic resident register number, health insurance card number, and passport number used in transaction. On the transaction type selection screen 2200, a transaction type selection section 2201 has a selection button 2203 which is to select a desired transaction type from a plurality of transaction types (not shown), and a display area 2202 which displays the selected transaction type ("driving license number") in this figure. On the transaction type selection screen 2200, a confirm button 2204 which confirms the selected transaction type and a previous screen transition button 2205 which returns to the previous screen (transaction form selection screen 2100) are displayed.

In step SA7, the input screen control section 111 decides whether or not a desired transaction type is selected from the plurality of transaction types. In this instance, the decision result is set as "No", and the same decision is repeated. When the "driving license number" is selected as a transaction type by pressing the selection button 2203 by the customer, the input screen control section 111 sets the decision result in step SA7 as "Yes".

In step SA8, the input screen control section 111 displays the various-number input screen 2300 shown in FIG. 9(a) on the display section 120. The various-number input screen 2300 is a screen which permits a customer to manually input a customer identification number corresponding to the transaction type selected in step SA7. In this instance, because the driving license number is selected as the transaction type, a driving license number display region 2302 in which the manually input driving license number is displayed, a ten-key section 2301 which inputs the driving license number as numerical characters in units of figures, a confirm button 2303 which is to confirm the manually input driving license number, and a previous-screen transition button 2304 which returns to the previous screen (transaction type selection screen 2200) are displayed on the various-number input screen 2300.

In step SA9, a manual input process of a customer identification number is executed by a customer. In this instance, the customer presses the ten-key section 2301 to sequentially manually input the driving license number 1100 ("000000347690") of the driving license 1100 shown in, e.g., FIG. 4. In this manner, a driving license number, i.e., "000000347690" is displayed in the driving license number display region 2302. The customer presses the confirm button 2303 when the driving license number is correct.

Figure 7:
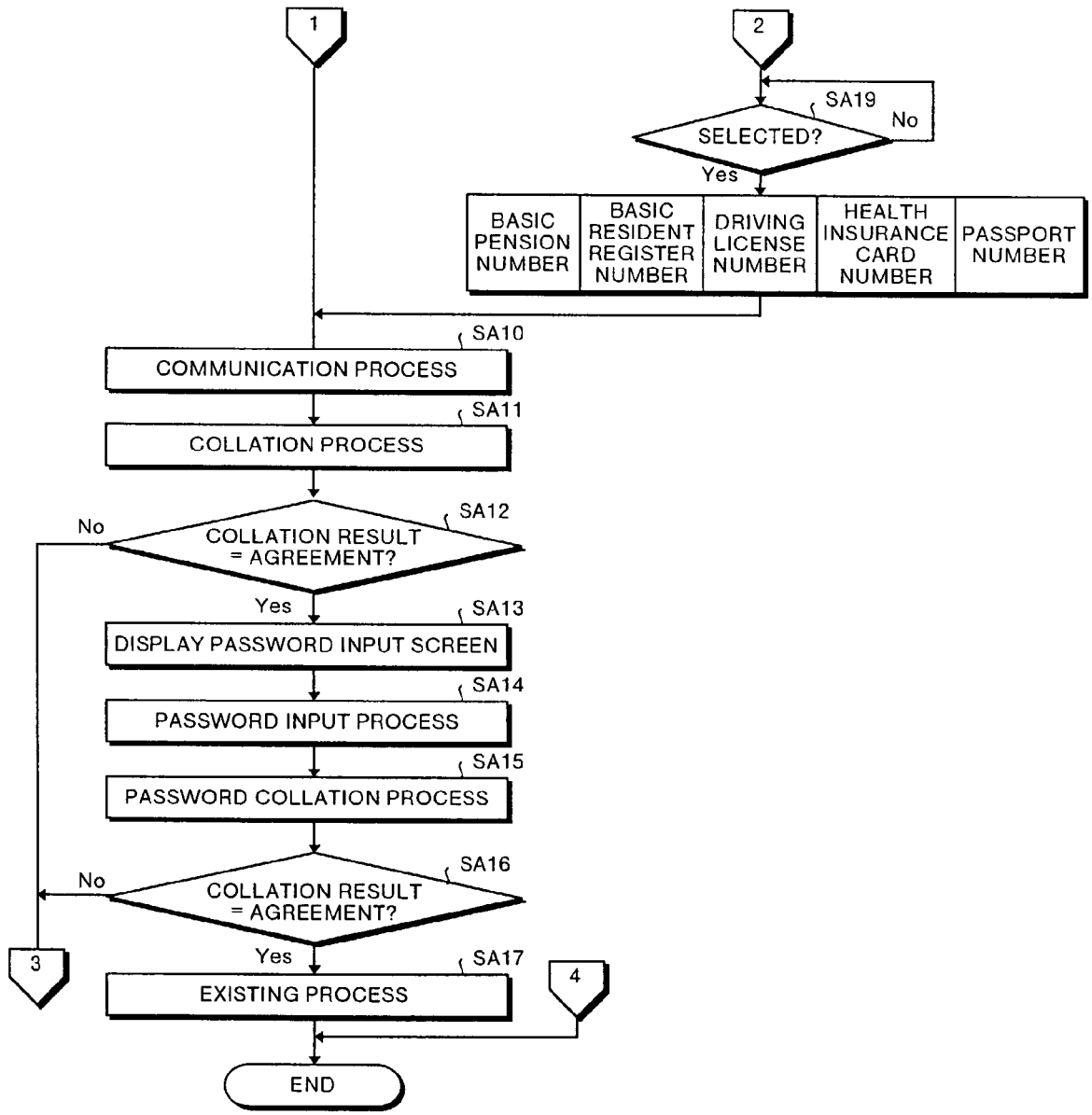
FIG. 7 is a flow chart which explains an operation of the embodiment.

In this manner, in step SA10 shown in FIG. 7, the main control section 115 provides the information of the manually input driving license number ("000000347690") to the communication control section 140. The communication control section 140 executes a communication process of transmitting the information of the driving license number to the bank host terminal 300 shown in FIG. 3 through the network 200. The information of the driving license number is received by the communication control section 310 of the bank host terminal 300 and is then received by the control section 321.

In step SA11, the control section 321 controls the database searching section 322 or the external database searching section 323 to execute a collation process. More specifically, the control section 321 causes the database searching section 322 to search the customer information database 350 by using the driving license number (customer identification number) as a key. In this instance, the driving license number does not exist in the customer information database 350, the control section 321 causes the external database searching section 323 to search the other-bank customer information database 450 by using the driving license number as a key.

In this manner, the external database searching section 323 searches the other-bank customer information database 450 by using the driving license number as a key through the communication control section 310, the network 200, and the other-bank host terminal 400 (see FIG. 1). In this instance, the search result that the driving license number does not exist in the other-bank customer information database 450 is provided to the control section 321.

The control section 321 selects the driving license number management database 550 corresponding to the driving license number as a searching target of an external database. The control section 321 causes the external database searching section 323 to search the driving license number management database 550 by using the driving license number as a key. In this manner, the external database searching section 323 searches the driving license number management database 550 by using the driving license number as a key through the communication control section 310, the network 200, and the database server 500 (see FIG. 1).

In this instance, when it is assumed that a driving license number which coincides with the driving license number exists in the driving license number management database 550, the external database searching section 323 acquires information of a name and a birth date related to the driving license number from the driving license number management database 550 and provides the information to the control section 321. In this manner, the control section 321 collates the information of the name and the birth date with the customer information database 350.

More specifically, in this instance, customer information specified on the basis of the driving license number is searched for in the customer information database 350. In step SA12, the control section 321 decides whether or not the collation result is agreement. When the decision result is "No", i.e., a transaction using the driving license number (customer identification number) is not established, the process in step SA1 is executed.

On the other hand, when the collation result is agreement ("Yes"), the control section 321 transmits the customer information (account number, account type, name, birth date, amount outstanding, and password) from the customer information database 350 to the automatic transaction machine 100 through the communication control section 310 and the network 200.

When the customer information is received by the communication control section 140 shown in FIG. 2, in step SA13, the input screen control section 111 displays a password input screen 2400 shown in FIG. 9(b) on the display section 120. The password input screen 2400 is a screen which permits a customer to input the password corresponding to the account. On the password input screen 2400, a ten-key section 2401 which inputs the password as numerical characters in units of figures, a password display region 2402 which displays the input password, a confirm button 2403 which confirms the input password, and a previous-screen transition button 2404 which returns to the previous screen (various-number input screen 2300) are displayed.

In step SA14 shown in FIG. 7, a customer executes an input process of a password. In this instance, the customer presses the ten-key section 2401 to sequentially input 4-digit password "1234". In this manner, the password "1234" is displayed in the password display region 2402.

When the password is correct, the customer presses the confirm button 2403. In this manner, in step SA15 shown in FIG. 7, collation is executed between the input password "1234" and the password in the customer information database 350 on the bank host terminal 300 shown in FIG. 3.

More specifically, the data of the password "1234" input by the customer is provided to the control section 321 of the bank host terminal 300 shown in FIG. 3 through the communication control section 140, the network 200, and the communication control section 310 shown in FIG. 2. In this manner, the control section 321 collates the password "1234" input by the customer with the password in the customer information database 350.

In step SA16, the control section 321 decides whether or not the collation result in step SA15 is agreement. When the decision result is "No", the transaction is not established.

On the other hand, when the decision result in step SA16 is "Yes", i.e., when the customer is authenticated with the password, in step SA17, the control section 321 executes a process related to an existing transaction (in this instance, money deposit) and then ends a series of processes.

When a basic pension number or a basic resident register number is manually input by the customer as the customer identification number, because the information of the basic pension number and the basic resident register number exist in the customer information database 350, the control section 321 shown in FIG. 3 executes a collation process (step SA11) on the basis of the information. In addition, when a health insurance card number or a passport number is manually input by the customer as the customer identification number, the control section 321 executes the collation process (step SA11) by using the external health insurance card number management database 850 or the passport number management database 950 (see FIG. 1) as a collation target.

Figure 6:
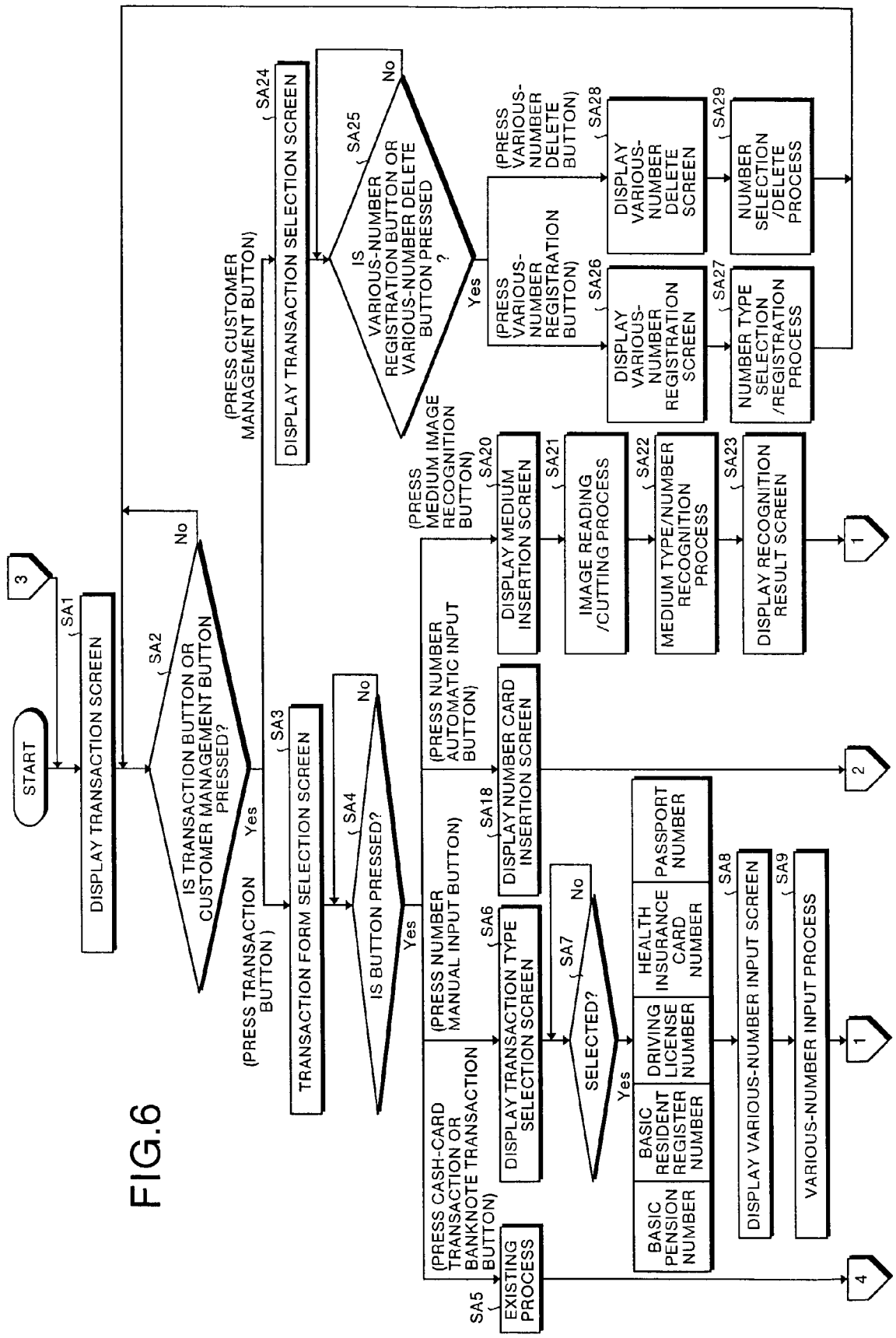
FIG. 6 is a flow chart which explains an operation of the embodiment.

When the balance inquiry button 2005 of the transaction screen 2000 shown in FIG. 10(a) is pressed by the customer, the input screen control section 111 sets the decision result in step SA2 shown in FIG. 6 as "Yes". In step SA3, the input screen control section 111 displays the transaction form selection screen 2100 shown in FIG. 10(b) on the display section 120. In this state, the customer identification number automatic input button 2104 is pressed by the customer, and thus the input screen control section 111 sets the decision result in step SA4 as "Yes". In step SA18, the input screen control section 111 displays a number card insertion screen (not shown) on the display section 120. The number card insertion screen is a screen which instructs the customer to insert the number card 1200 (see FIG. 5) used in a customer identification number automatic input transaction into the reading section 130.

When the number card 1200 (see FIG. 5) is inserted into the reading section 130 by the customer, the reading section 130 magnetically reads the customer identification number information 1203 (basic pension number, basic resident register number, driving license number, health insurance card number, or passport number) from the magnetic stripe 1201 to give it to the main control section 115. In step SA19, whether or not one number is selected from the customer identification number information 1203 by the customer or not is decided. When the decision result is "No", the same decision is repeated. When it is assumed that the basic pension number is selected by the customer, the main control section 115 sets the decision result in step SA19 as "Yes".

In step SA10, the main control section 115 provides the information of the selected basic pension number to the communication control section 140. The communication control section 140 executes a communication process such that the information of the basic pension number is transmitted to the bank host terminal 300 shown in FIG. 3 through the network 200. The information of the basic pension number is received by the communication control section 310 of the bank host terminal 300 and then received by the control section 321.

In step SA11, the control section 321 causes the database searching section 322 to search the customer information database 350 by using the basic pension number as a key. In this instance, when it is assumed that a basic pension number which agrees with the basic pension number exists in the customer information database 350, the database searching section 322 provides the searching result to the control section 321. In this instance, in step SA12, the control section 321 sets the decision result as "Yes" because the collation result between both the basic pension numbers is agreement. The control section 321 transmits the customer information (account number, account type, name, birth date, amount outstanding, and password) from the customer information database 350 to the automatic transaction machine 100 through the communication control section 310 and the network 200.

When the customer information is received by the communication control section 140 shown in FIG. 2, in step SA13, the input screen control section 111 displays the password input screen 2400 shown in FIG. 9(*b*) on the display section 120. In step SA14, an input process of the password is executed by the customer. Thereafter, in step SA15, a password collation process is executed. In step SA16, the control section 321 (see FIG. 3) decides whether or not the collation result in step SA15 is agreement. When the decision result is "Yes", in step SA17, the control section 321 executes a process related to an existing transaction (in this instance, balance inquiry) and then ends a series of processes.

Figure 10:
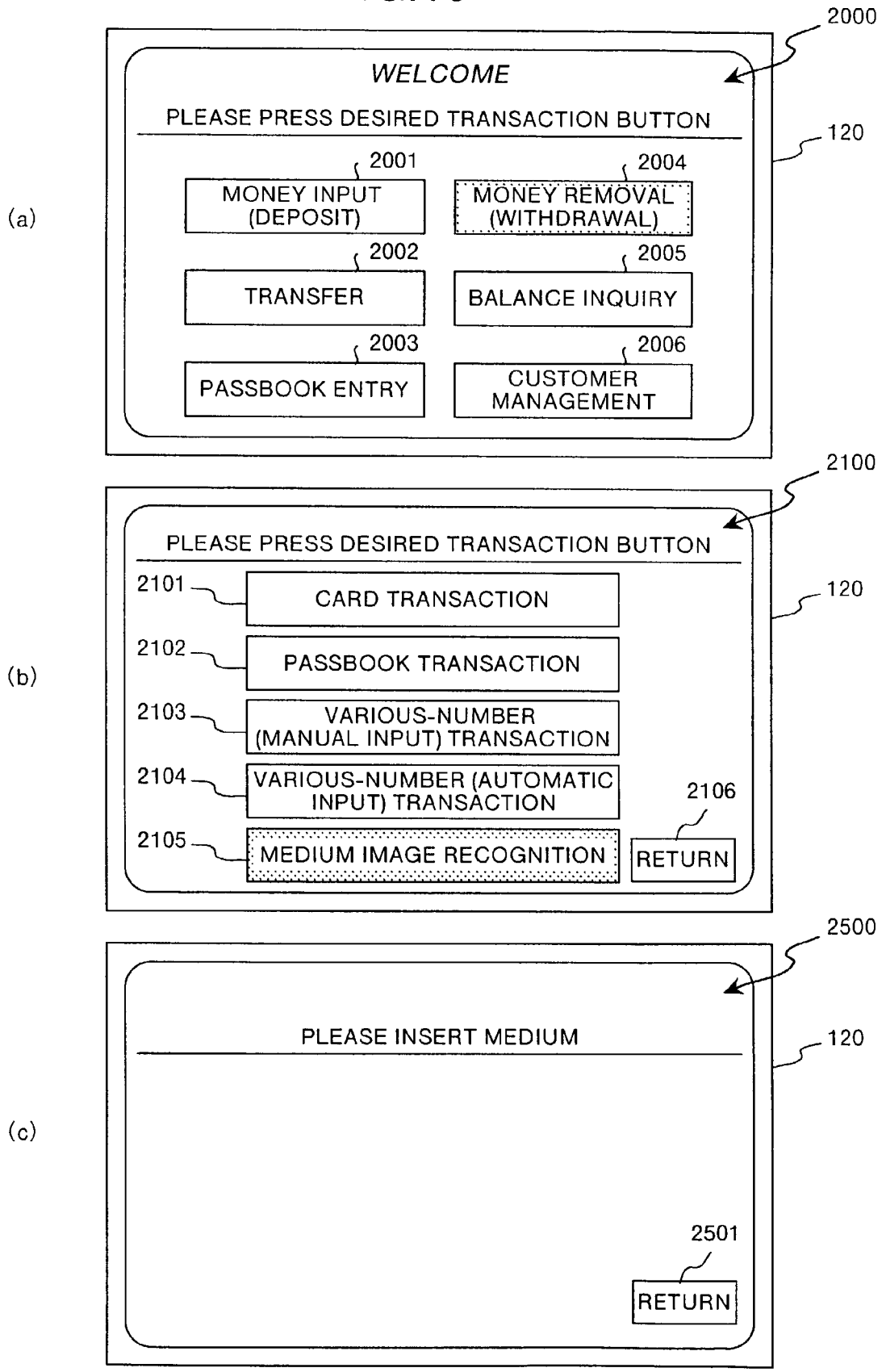
FIGS. 10(a) to 10(c) are diagrams which show various display screens of the display section 120 shown in FIG. 2, FIGS. 11(a) and 11(b) are diagrams which show various display screens of the display section 120 shown in FIG. 2, and FIGS. 12(a) to 12(c) are diagrams which show various display screens of the display section 120 shown in FIG. 2.

When the balance inquiry button 2005 of the transaction screen 2000 shown in FIG. 10(*a*) is pressed by the customer, the input screen control section 111 sets the decision result in step SA2 shown in FIG. 6 as "Yes". In step SA3, the input screen control section 111 displays the transaction form selection screen 2100 shown in FIG. 10(*b*) on the display section 120.

In this state, the identification number medium input button 2105 is pressed by the customer, the input screen control section 111 sets the decision result in step SA4 as "Yes". In step SA20, the input screen control section 111 displays a medium insertion screen 2500 shown in FIG. 10(*c*) on the display section 120. The medium insertion screen 2500 is a screen which is instructs the customer to insert a medium (e.g., the driving license 1100, see FIG. 4) used in a customer identification number medium input transaction into the reading section 130. A previous-screen transition button 2501 which returns to the previous screen (transaction form selection screen 2100) is displayed in the medium insertion screen 2500.

When the driving license 1100 (see FIG. 4) is inserted into the reading section 130 by the customer, in step SA21, the reading section 130 optically reads the image of a driving license number 1101 and then cuts a partial image including the driving license number 1101 from the image. In step SA22, the main control section 115 executes a process of recognizing a medium type (in this instance, driving license) and a customer identification number (in this instance, the driving license number 1101) on the basis of the image and the partial image read by the reading section 130.

More specifically, the main control section 115 recognizes a medium type on the basis of collation between data of horizontal rules on a plurality of preset media and horizontal rules included in the image. In this instance, the main control section 115 recognizes the medium type as a driving license. The main control section 115 recognizes a customer identification number recognized as characters from the partial image. In this instance, the type decision/character recognition section 114 recognizes the driving license number 1101 ("000000347690") as the customer identification number. The main control section 115 provides the recognition result of the medium type and the customer identification number to the input screen control section 111.

In this manner, in step SA23, the input screen control section 111 displays a recognition result screen 2600 shown in FIG. 11(*a*) on the display section 120. The recognition result screen 2600 is a screen which displays the recognition result of the medium type and the customer identification number.

On the recognition result screen 2600, a "driving license" (medium type) and "000000347690" (customer identification number) are displayed. On the recognition result screen 2600, a confirm button 2601 which is to confirm a medium type/number recognition result and a previous-screen transition button 2602 which is to return to the previous screen (medium insertion screen 2500) are displayed.

When the customer who has completed the confirmation presses the confirm button 2601, in step SA10 shown in FIG. 7, the main control section 115 provides the information of the recognized driving license number ("000000347690") to the communication control section 140. The communication control section 140 executes a communication process of transmitting the information of the driving license number to the bank host terminal 300 shown in FIG. 3 through the network 200. The information of the driving license number is received by the communication control section 310 of the bank host terminal 300 and is then received by the control section 321. In steps subsequent to step SA11, the same operation as described above will be executed on the basis of the driving license number.

A registration process of registering an account number, . . . , a password, and a customer identification number (basic pension number, basic resident register number, and the like) in the customer information database 350 shown in FIG. 3 and a delete process of deleting the registered customer identification number will be described below. The registration process and deleting process are executed on the basis of an operation of a person in charge of a financial institution in response to a request of the customer.

Figure 12:
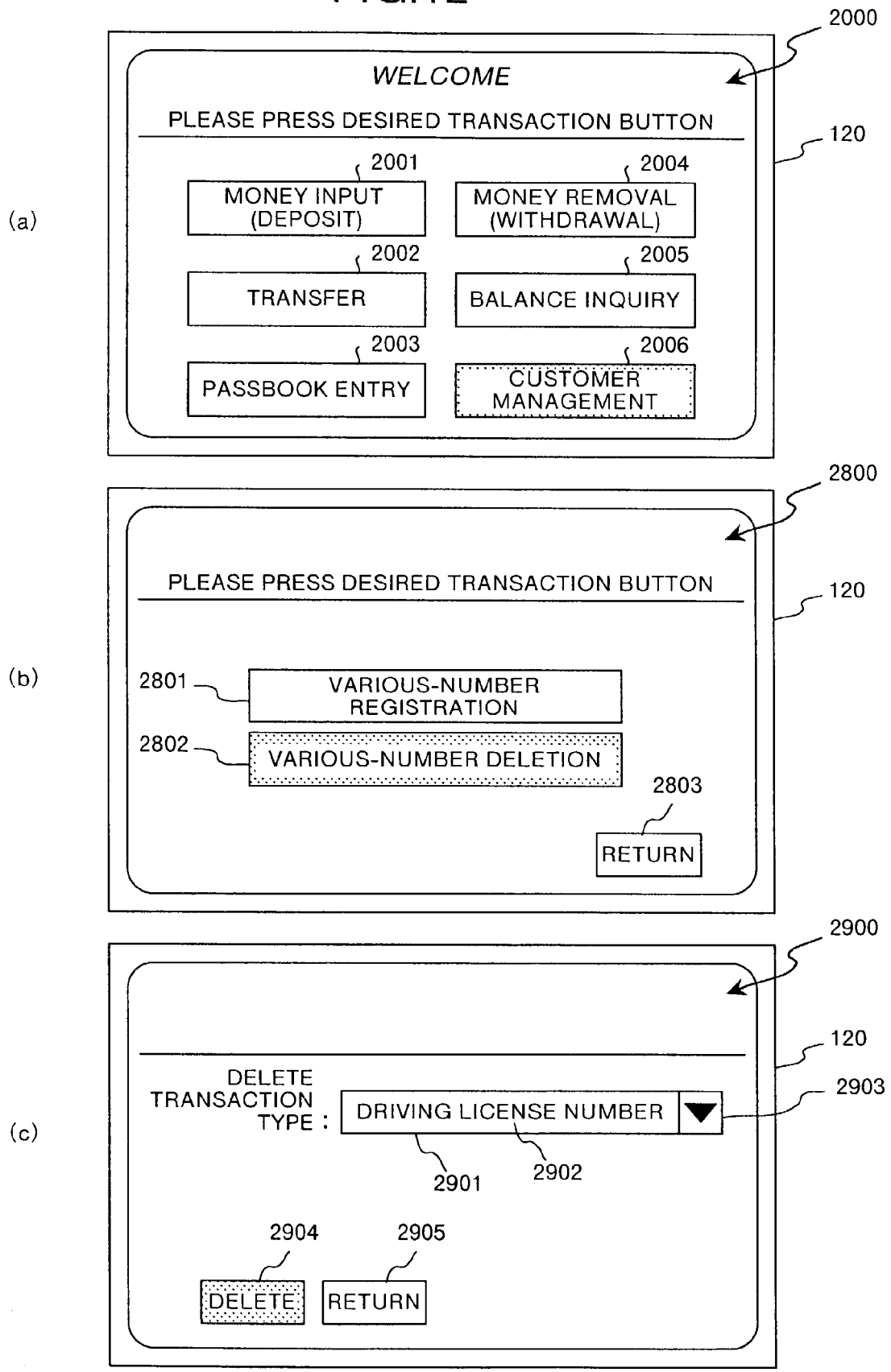

The registration process will be described below. When the customer management button 2006 of the transaction screen 2000 shown in FIG. 12(*a*) is pressed by a person in charge, the input screen control section 111 sets the decision result in step SA2 shown in FIG. 6 as "Yes". In step SA24, the input screen control section 111 displays a transaction selection screen 2800 shown in FIG. 12(*b*) on the display section 120. The transaction selection screen 2800 is a screen which is to select one of the registration process or the deleting process. On the transaction selection screen 2800, a various-number registration button 2801 which selects the registration process, a various-number delete button 2802 which selects the deleting process, and a previous screen transition button 2803 which returns to the previous screen (2000) are displayed.

In step SA25, the input screen control section 111 decides whether or not the various-number registration button 2801 or the various-number delete button 2802 is pressed by a person in charge. When the decision result is "No", the same decision is repeated. When the various-number registration button 2801 is pressed by the person in charge, the input screen control section 111 sets the decision result in step SA25 as "Yes". In step SA26, the input screen control section 111 displays a various-number registration screen (not shown) on the display section 120. The various-number registration screen is a screen which registers the customer identification number (driving license number, basic pension number, or the like) in the customer information database 350 shown in FIG. 3 in response to the account number of the customer.

When the customer identification number and the account number are input by the person in charge, in step SA27, the main control section 115 transmits information of the customer identification number and the account number to the communication control section 140, the network 200, and the communication control section 310 shown in FIG. 3. In this manner, the communication control section 310 registers the information of customer identification number in the customer information database 350 in response to the account number.

The deleting process will be described below. When the various-number delete button 2802 shown in FIG. 12(b) is pressed by the person in charge, the input screen control section 111 sets the decision result in step SA25 as "Yes". When the account number of the customer is input by the person in charge, in step SA28, the input screen control section 111 displays a various-number delete screen 2900 shown in FIG. 12(c) on the display section 120. The various-number delete screen 2900 is a screen which deletes the customer identification number (driving license number or the like) which has been registered in the customer information database 350 shown in FIG. 3.

The various-number delete screen 2900 comprises a delete transaction type selection section 2901 which selects the type (delete transaction type) of the customer identification number registered in response to the account number, a selection button 2903 which is to select a desired transaction type from a plurality of transaction types (driving license number, basic pension number, and the like), and a display region 2902 in which the selected transaction type (in the same figure, the "driving license number") is displayed.

When the "driving license number" is selected by the person in charge, in step SA29, the main control section 115 transmits the information of the customer identification number (in this instance, the "driving license number") and the account number to the communication control section 140, the network 200, and the communication control section 310 shown in FIG. 3. In this manner, the communication control section 310 deletes the information of the customer identification number (in this instance, the "driving license number") registered in the customer information database 350 in response to the account number.

As described above, according to the embodiment, on the basis of the basic pension number, the basic resident register number, the driving license number, the health insurance card number, or the passport number which is the customer identification number, collation of the customer and transaction are performed. For this reason, the customer need not carry a cash-card or a passbook, unlike a conventional art. Therefore, the convenience of the customer can be improved while maintaining security related to the transaction.

According to the embodiment, because the customer identification number is automatically input by using the driving license 1100 or the number card 1200, the customer need not to memorize the identification number. Therefore, the convenience of the customer can be improved.

As described above, according to the present invention, because collation and the transaction are performed on the basis of the identification number, the customer need not carry a cash-card and a passbook, unlike a conventional art. For this reason, the convenience of the customer can be improved while maintaining security related to the transaction advantageously.

According to the present invention, because collation and the transaction are performed on the basis of the identification number input from the touch panel display section, the customer need not carry a cash-card and a passbook, unlike a conventional art. For this reason, the convenience of the customer can be improved while maintaining security related to the transaction advantageously.

According to the present invention, because the identification number is automatically input by using a medium, the customer need not memorize her/his identification number. For this reason, the convenience of the customer can be improved advantageously.

According to the present invention, because the identification number is automatically input by using a recording medium on which only the identification number is recorded, the customer need not memorize her/his identification number. For this reason, the convenience of the customer can be improved advantageously.

According to the present invention, because collation and the transaction are performed on the basis of a basic pension number, a basic resident register number, a driving license number, a health insurance card number, or a passport number which is the identification number, the convenience of the customer can be improved while maintaining security related to the transaction advantageously.

As has been described above, a method of, an apparatus and a system for automatic transaction according to the present invention are useful to improve the convenience of various transactions such as money deposit, withdrawal, transfer, balance inquiry, and passbook entry and security at a financial institution.

The invention claimed is:

1. An automatic transaction apparatus connected to a host apparatus of a financial institution via a network, comprising:
   an input unit configured to receive an input identification number and an input password from a customer;
   a first controller configured to
   transmit via the network the input identification number and the input password to the host apparatus connected via the network to a server of an authentication organization which is an official organization different from the financial institution, the server having a first database storing authentication information including a unique identification number allocated to the customer by the authentication organization, the host apparatus having a second database storing customer information including the unique identification number, an account number of an account the customer has at the financial institution, and a password corresponding to the account number, and
   execute a money transaction based on a result of a collation of the input password with the password included in the customer information retrieved by the host apparatus from the second database based on the authentication information which is retrieved by the host apparatus from the first database based on the input identification number, the collation being performed by the host apparatus;
   a reading unit configured to read the input information related to the unique identification number as the input identification number from a recording medium different from a card that is issued by the financial institution;
   a type decision/character recognition section for deciding a type of identification medium on which the unique identification number is printed; and
   a second controller configured to control the input unit to allow the customer to select inputting the input identification number manually via the input unit or automatically via the reading unit using the recoding medium,
   wherein the unique identification number is at least one of a basic pension number, a basic resident register number, a driving license number, a health insurance card number, and a passport number.

2. The automatic transaction apparatus according to claim 1, wherein the reading unit is configured to optically read the unique identification number from a recording medium issued by the authentication organization.

3. An automatic transaction method, comprising:

receiving through an automatic transaction apparatus connected to a network an input identification number manually input or automatically read by a reading unit from a recording medium different from a card that is issued by a financial institution and an input password;

deciding a type of identification medium on which the input identification number is printed;

transmitting from the automatic transaction apparatus the input identification number and the input password to a host apparatus of the financial institution via the network, the host apparatus being connected via the network to a server of an authentication organization which is an official organization different from the financial institution, the server having a first database, the host apparatus having a second database;

storing in the first database authentication information including a unique identification number allocated to a customer by the authentication organization;

storing in the second database customer information including the unique identification number, an account number of an account the customer has at the financial institution, and a password corresponding to the account number;

retrieving at the host apparatus the authentication information from the first database based on the input unique identification number;

retrieving at the host apparatus the customer information from the second database based on the authentication information retrieved;

collating at the host apparatus the input password with the password included in the customer information retrieved; and executing a money transaction at the automatic transaction apparatus based on a result of the collation, wherein the unique identification number is at least one of a basic pension number, a basic resident register number, a driving license number, a health insurance card number, and a passport number.

4. The automatic transaction method according to claim 3, wherein the input unique identification number is optically read from a recoding medium issued by the authentication organization.

5. An automatic transaction system, comprising:

an automatic transaction apparatus configured to receive an input identification number manually input or automatically read by a reading unit from a recording medium different from a card that is issued by a financial institution and an input password, and deciding a type of identification medium on which the input identification number is printed; and a host apparatus of the financial institution connected via a network to the automatic transaction apparatus and to a server of an authentication organization which is an official organization different from the financial institution, the server having a first database storing authentication information including a unique identification number allocated to a customer by the authentication organization, the host apparatus having a second database storing customer information including the unique identification number, an account number of an account the customer has sat the financial institution, and a password corresponding to the account number, the host apparatus being configured to retrieve the authentication information from the first database based on the input identification number, retrieve the customer information from the second database based on the authentication information retrieved, and collate the input password with the password included in the customer information retrieved, wherein the automatic transaction apparatus is configured to execute a money transaction based on a result of the collation performed by the host apparatus, and the unique identification number is at least one of a basic pension number, a basic resident register number, a driving license number, a health insurance card number, and a passport number.

6. The automatic transaction apparatus according to claim 1, wherein the automatic transaction apparatus includes an automated teller machine to execute a money transaction based on the input identification number received from a cash card.

7. The automatic transaction apparatus according to claim 1, wherein the automatic transaction apparatus selectively receives the input identification number from a cash card or any medium other than the cash card.

8. The automatic transaction apparatus according to claim 5, wherein the automatic transaction apparatus identifies an account number based on the input identification number received from any medium other than the cash card when the input identification number is collated successfully.

* * * * *